(12) United States Patent
Basurtekar

(10) Patent No.: US 10,612,566 B2
(45) Date of Patent: Apr. 7, 2020

(54) BLEED VALVE ARRANGEMENTS; AND METHODS

(71) Applicant: Eaton Intelligent Power Limited, Dublin (IE)

(72) Inventor: Shrikant Chandrakant Basurtekar, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 143 days.

(21) Appl. No.: 15/553,131

(22) PCT Filed: Feb. 25, 2016

(86) PCT No.: PCT/US2016/019640
§ 371 (c)(1),
(2) Date: Aug. 23, 2017

(87) PCT Pub. No.: WO2016/138309
PCT Pub. Date: Sep. 1, 2016

(65) Prior Publication Data
US 2018/0031008 A1   Feb. 1, 2018

(30) Foreign Application Priority Data

Feb. 26, 2015 (IN) .............................. 211/KOL/2015

(51) Int. Cl.
*F15B 13/04* (2006.01)
*F15B 21/044* (2019.01)
(Continued)

(52) U.S. Cl.
CPC ........ *F15B 13/0405* (2013.01); *F15B 21/044* (2013.01); *F15B 1/265* (2013.01);
(Continued)

(58) Field of Classification Search
CPC ................ F15B 13/0405; F15B 21/044; F15B 2211/655; F15B 2211/6303; F15B 1/265;
(Continued)

(56) References Cited

U.S. PATENT DOCUMENTS 4,524,793 A   6/1985   Silverwater
5,211,200 A   5/1993   Cassidy
(Continued)

FOREIGN PATENT DOCUMENTS

AT   309 738 B   8/1973
WO   2009/095780 A2   8/2009

OTHER PUBLICATIONS

International Search Report and Written Opinion of the International Searching Authority for corresponding International Patent Application No. PCT/US2016/019640 dated Jul. 12, 2016, 13 pages.
(Continued)

*Primary Examiner* — Craig J Price
(74) *Attorney, Agent, or Firm* — Merchant & Gould P.C.

(57) ABSTRACT

Aspects and techniques of the present disclosure relate to a bleed valve system for bleeding fluid of a first, lower, specific gravity from a fluid of a second, higher, specific gravity, in a fluid system. The techniques can be used to provide a bleed valve system, for a pressurized fluid system, that is not sensitive to rotational orientation around a mounting axis.

22 Claims, 13 Drawing Sheets

(51) Int. Cl.
*F15B 1/26* (2006.01)
*G01M 3/30* (2006.01)
*G01M 3/18* (2006.01)

(52) U.S. Cl.
CPC . *F15B 2211/6303* (2013.01); *F15B 2211/655* (2013.01); *G01M 3/184* (2013.01); *G01M 3/30* (2013.01); *Y10T 137/0324* (2015.04); *Y10T 137/309* (2015.04)

(58) Field of Classification Search
CPC ... F16K 37/0091; G01M 3/2876; G01M 3/30; G01M 3/144; G01M 3/184; Y10T 137/0318; Y10T 137/0324; Y10T 137/3003; Y10T 137/3084; Y10T 137/304
USPC .......................................... 137/171, 197, 199
See application file for complete search history.

(56) References Cited

U.S. PATENT DOCUMENTS

| | | | |
|---|---|---|---|
| 5,305,793 A | | 4/1994 | Cencula |
| 6,047,720 A | * | 4/2000 | Stein ................. F16K 24/04 137/199 |
| 6,119,661 A | | 9/2000 | Deland et al. |
| 8,272,398 B2 | | 9/2012 | Erdmann |
| 8,333,217 B2 | | 12/2012 | Raper et al. |
| 8,439,065 B2 | | 5/2013 | Dirkin et al. |
| 8,833,695 B2 | | 9/2014 | Dhuri et al. |
| 2009/0289208 A1 | * | 11/2009 | Yonezawa ............. F15B 21/044 251/216 |
| 2009/0293965 A1 | | 12/2009 | Raper et al. |
| 2013/0092266 A1 | | 4/2013 | Dhuri et al. |
| 2017/0241558 A1 | * | 8/2017 | Mande ................. G01M 3/2815 |

OTHER PUBLICATIONS

Restrictor Orifice, Bird Precision RB# 82464, http://www.birdprecision.com/orifices/orifice-styles.cfm, 1 page, (2006-2017).
Protective Vents: Screw-in Vents; W.L. Gore & Associates, Inc., 2 pages, (2011-2013).

* cited by examiner

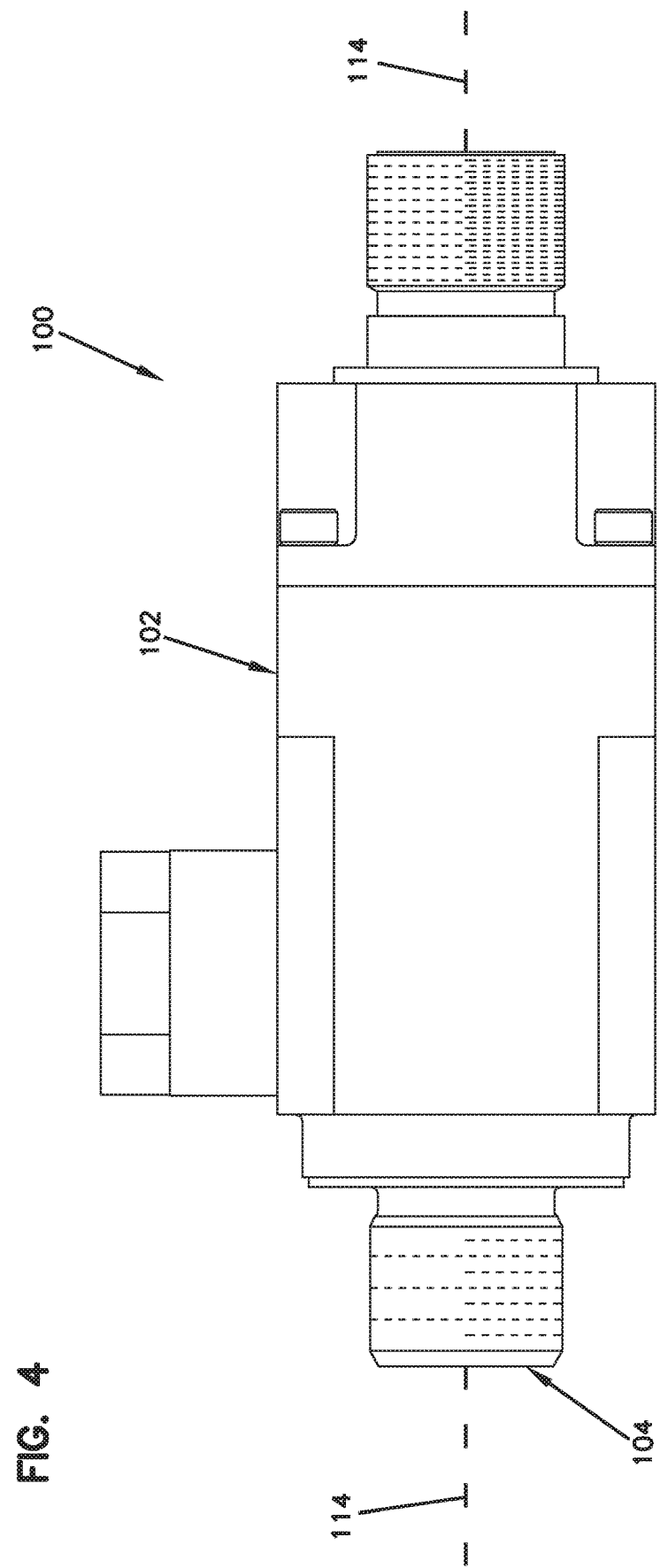

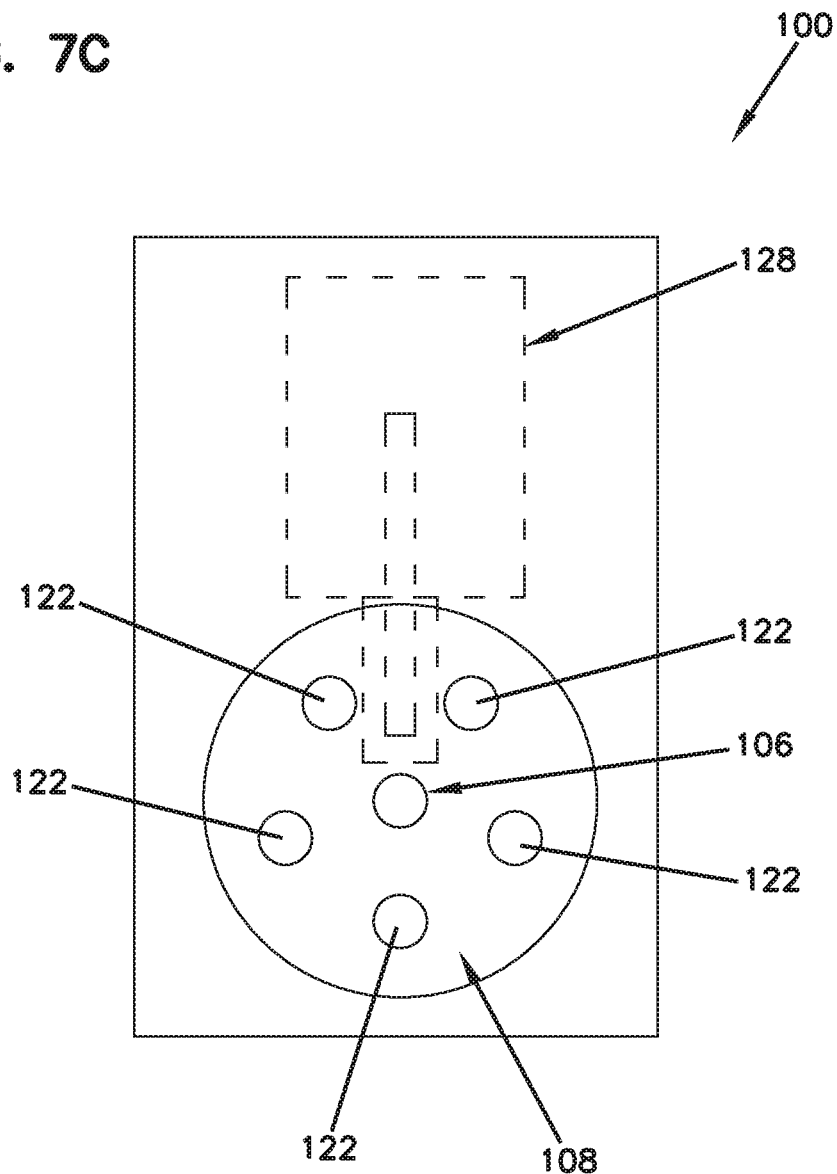

BLEED VALVE ARRANGEMENTS; AND METHODS

CROSS-REFERENCE TO RELATED APPLICATION

This application is a National Stage Application of PCT/US2016/019640, filed on Feb. 25, 2016, which claims the benefit of Indian Patent Application No. 211/KOL/2015, filed on Feb. 26, 2015, the disclosures of which are incorporated herein by reference in their entireties. To the extent appropriate, a claim of priority is made to each of the above disclosed applications.

TECHNICAL FIELD

The present disclosure relates generally to bleed valve arrangements for bleeding a fluid of a first, lower, specific gravity from a fluid of a second, higher, specific gravity, in various fluid systems. An example is bleeding air from a liquid system. Principles applicable to bleed valve arrangements are disclosed which provide options accommodating various orientations around a mounting axis. An example is described in the context of an automatic bleed valve for use in a pressurized fluid system such as a hydraulic system.

BACKGROUND

In many fluid systems, fluids of different specific gravity collect. It is sometimes desirable to bleed a fluid of a first, lower, specific gravity from a fluid of a second, higher, specific gravity, from the fluid system. Many fluid systems are for managing air in a liquid system, where the air is a fluid of lower, specific gravity and the liquid is a fluid of higher, specific gravity. A typical example would be separating air from a hydraulic fluid or similar liquid.

Many bleed valve arrangements are designed to manage the amount of air present in a liquid system. For example, air bleed valves are used in pressurized liquid systems such as hydraulic systems to remove unwanted air. Air presence in such systems is detrimental because it can cause cavitation in pumps, oxidation, foaming, and/or reduced bulk modulus. Example bleed valves are shown in U.S. Pat. Nos. 8,833,695 and 8,272,398. The complete disclosures of these references are incorporated herein by reference.

An example bleed valve assembly 10 is depicted in FIG. 1. This bleed valve assembly 10 includes a housing 12, a liquid level sensor 14, a solenoid valve 16, and a bleed chamber 18. The housing 12 includes an inlet port 20.

In use, this bleed valve assembly 10 would be mounted in flow communication with an appropriate, typically upper, portion of a tank of a fluid system, typically under pressure (for example a hydraulic system, not shown) to receive liquid flow from the fluid system through the port 20. Over time, air trapped in the fluid system would also enter the bleed valve assembly 10 through the port 20 and into the bleed chamber 18. The function of the bleed valve assembly 10 is to selectively bleed this air from the fluid system with minimal discharge of the liquid.

The liquid level sensor 14 is configured to detect when the liquid in the bleed chamber 18 has fallen below a predetermined level, thus indicating an amount of excess air has been collected in the system that needs to be bled therefrom. The liquid level sensor 14 can be an optical sensor, or a contact sensor, for example. When the liquid level sensor 14 no longer detects the designated or selected liquid level, it sends a signal, for example through an electronic control mechanism 22, to the solenoid valve 16 to open and allow the excess air to vent from the bleed valve assembly 10, for example, to the atmosphere.

In particular, an air bleed conduit 24 is in fluid communication with the bleed chamber 18 and the solenoid valve 16. The air bleed conduit 24 allows excess air to vent from the bleed chamber 18 through outlet 26 and valve seat 28 when the solenoid valve 16 is actuated, to open the valve seat 28 to allow air flow therethrough, by movement of valve member 30 from the valve seat 28 in response to the signal from the liquid level sensor 14. The solenoid valve 16 closes (for example under spring pressure) once the liquid level rises sufficiently (i.e., after bleed). Because the hydraulic system is under internal pressure, the excess air is readily forced from the bleed chamber 18 and the bleed valve assembly 10 when the valve seat 28 opens.

Typically, the housing 12 is configured and positioned in use, such that a mounting axis 32 thereof extends horizontally or coaxially with the port 20. This keeps air above the liquid detection level in the bleed chamber 18 and below the air bleed conduit 24 as air enters the hydraulic system.

The bleed valve 10 includes a plug 34 to ensure the flow of excess air is directed through outlet 26 and the valve seat 28.

Improvements in bleed valves relating to assembly and use, are desirable.

SUMMARY

Bleed valve arrangements and features thereof are described. Also described are methods of assembly and use.

One aspect of the present disclosure relates to methods and techniques of mounting a bleed valve assembly that involve rotating the entire housing around a threaded mount and around a rotation axis during attachment to a pressurized fluid system. This method relates, for example, to retrofitting an improved bleed valve assembly to an existing pressurized fluid system or mounting it on a new pressurized fluid system that is designed to accept a single threaded mount.

Another aspect of the present disclosure relates to features of the automatic bleed valve assembly that can operate independently of vertical orientation around a mounting axis.

An improved bleed valve arrangement is provided that generally comprises a housing having a bleed chamber and a reservoir chamber and includes a fluid conduit arrangement communicating therebetween. An example bleed valve arrangement is depicted with the fluid conduit arrangement configured such that no matter how the housing is rotated about a mounting axis, the fluid conduit arrangement can provide for adequate fluid flow for proper and preferred operation.

An example bleed valve arrangement described includes a fluid bleed conduit that is arranged and configured to extend along the mounting axis. The mounting axis is generally horizontal so that even as the bleed valve arrangement is rotated thereabout, the fluid bleed conduit extends and remains in the direction of the mounting axis. The fluid bleed conduit is configured such that it can operate in any selected orientation resulting from a 360° rotation of the housing around the mounting axis.

In example arrangements depicted, the housing includes a fluid level detector in the bleed chamber to detect a selected fluid level therein, typically a level of a fluid of higher specific gravity. The fluid bleed conduit allows a fluid of lower specific gravity to flow from the bleed chamber to a solenoid valve upon detection of excess fluid of lower specific gravity in the bleed chamber.

BRIEF DESCRIPTION OF THE DRAWINGS

FIG. 4 is a schematic view taken opposite of the solenoid valve containing side of the bleed valve system shown in FIG. 3.

FIG. 7C is a schematic view taken toward an end of the bleed valve system shown in FIG. 7A.

DETAILED DESCRIPTION

Figure 1:
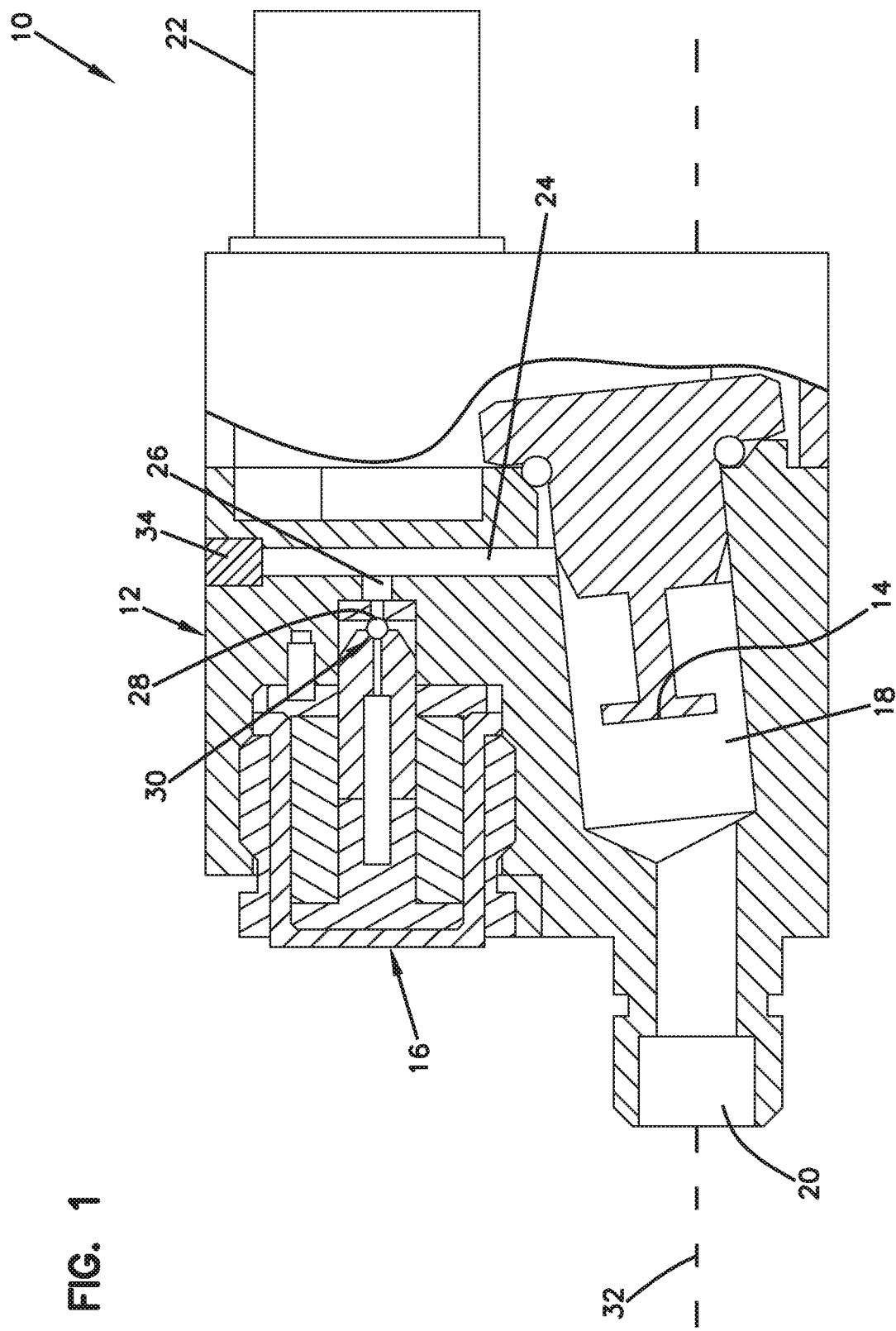
FIG. 1 is a schematic cross-sectional view of an example bleed valve subject to orientation issues with portions broken away to show internal details.

Further Discussion of Issues Regarding Assemblies in Accord with FIG. 1

Use of bleed valve assemblies of the type of assembly 10 shown in FIG. 1, is limited because of how they must be mounted in a system for proper operation. Typically this type of bleed valve assembly 10 has to be mounted such that the air bleed conduit 24 within the bleed valve assembly 10 is oriented to extend vertically, or near vertically, upward. This configuration is necessary to allow excess air to exit through the air bleed conduit 24 and the solenoid valve 16 without allowing a significant amount of liquid to escape when the solenoid valve is opened. Accordingly, the bleed valve assembly 10 cannot typically be mounted in systems where the air bleed conduit 24 may not be positioned to extend vertically, or near vertically, upward. For example, if the bleed valve assembly 10 is rotated 180° from what is shown in FIG. 1, it would not work because the solenoid valve 16 and the air bleed conduit 24 would not be positioned above the liquid level sensor 14 in the bleed chamber 18 to ensure that trapped air is purged out without leakage of liquid. Also, even when the bleed valve assembly 10 is rotated less than 180° about the mounting axis 32, but is such that the air bleed conduit 24 is no longer near vertical; the bleed valve assembly 10 would not necessarily function properly because of the risk of liquid loss.

Improved Fluid Bleed Valve and Methods in Accordance with the Present Disclosure General Principles of the Present Disclosure In general, in accordance with certain techniques described herein, bleed valve arrangements are provided that differ from the arrangement 10, FIG. 1, previously discussed, in two primary ways. First, a fluid bleed conduit, that allows a fluid of first, lower, specific gravity to flow from a bleed chamber to a solenoid valve, is arranged and configured to extend along a mounting axis, the mounting axis being generally horizontal so that even as the bleed valve is rotated thereabout, the fluid bleed conduit extends and remains in the direction of the mounting axis. Second, the housing is configured with both a bleed chamber and a reservoir chamber and includes a fluid conduit arrangement communicating therebetween. The fluid conduit arrangement is configured such that no matter how the housing is rotated about the mounting axis, the fluid conduit arrangement can provide for adequate fluid flow for proper and preferred operation.

A feature of the present disclosure is that techniques for bleed valve arrangement constructions are provided that can, if desired, even be used with a method of mounting a bleed valve assembly that involves rotating the entire housing around a threaded, rotation, axis during attachment to a pressurized fluid system. This is accomplished by having a fluid bleed conduit configured so that it can operate in any final position or selected orientation around that mounting axis.

An Example System, FIGS. 2-11

Referring first to FIGS. 2-6, multiple schematic views of an example bleed valve system 100 according to the present disclosure are shown. The example bleed valve system 100 comprises a housing 102. The housing 102 includes a mounting port 104. Although alternatives are possible, the housing 102 will typically be formed from metal, such as, for example, aluminum. When made from metal, other metals, such as steel, lead, zinc, and tin (or alloys) may be used in some instances. Of course, other materials are possible, such as, a polymer material.

The bleed valve system 100 is an improvement over the type of assembly 10 shown in FIG. 1, because the bleed valve system 100 does not have to be mounted with a fluid bleed conduit extending vertically or near vertically. This allows for a variety of mounting options discussed below.

One mounting option of the bleed valve system 100 involves rotating the entire housing 102 during attachment to a tank of a fluid (e.g., hydraulic) system. For example, the mounting port 104 may be configured with optional threads 103 or internal threads (not shown) that allow the housing 102 to be rotated and threaded in place. The final orientation of the housing 102 at the end of the mounting does not matter because the bleed valve system 100 can operate in any rotation orientation. This design is convenient because the invention allows for application of the techniques described herein, in some applications, in a bleed valve system 100 that can be retrofit to existing equipment or for new systems that are designed to accept a single threaded mount. The threaded mount can be fixed rationally relative to the housing 102 such that the housing 102 rotates when mounted.

Other mounting options of the bleed valve system 100 may be possible that do not involve rotating the entire housing 102 with a threaded mount. For example, the mounting port 104 of the bleed valve system 100 may be mounted to a tank of a fluid (e.g., hydraulic) system with a non-threaded mount; or, with a threaded coupling (not shown), that rotates relative to the housing 102.

Figure 2:
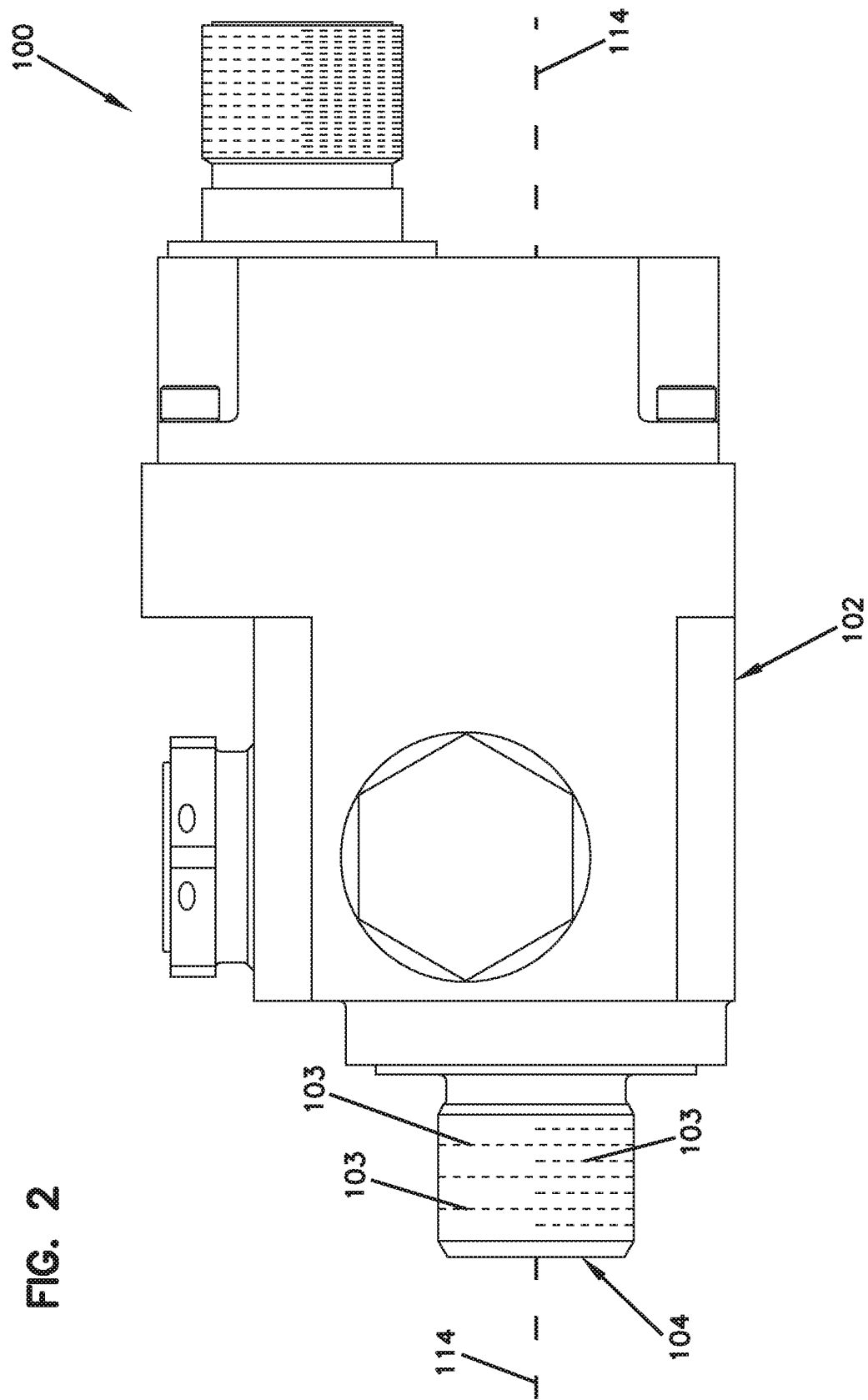
FIG. 2 is a schematic view of a bleed valve system in accord with the principles of the present disclosure.
Figure 3:
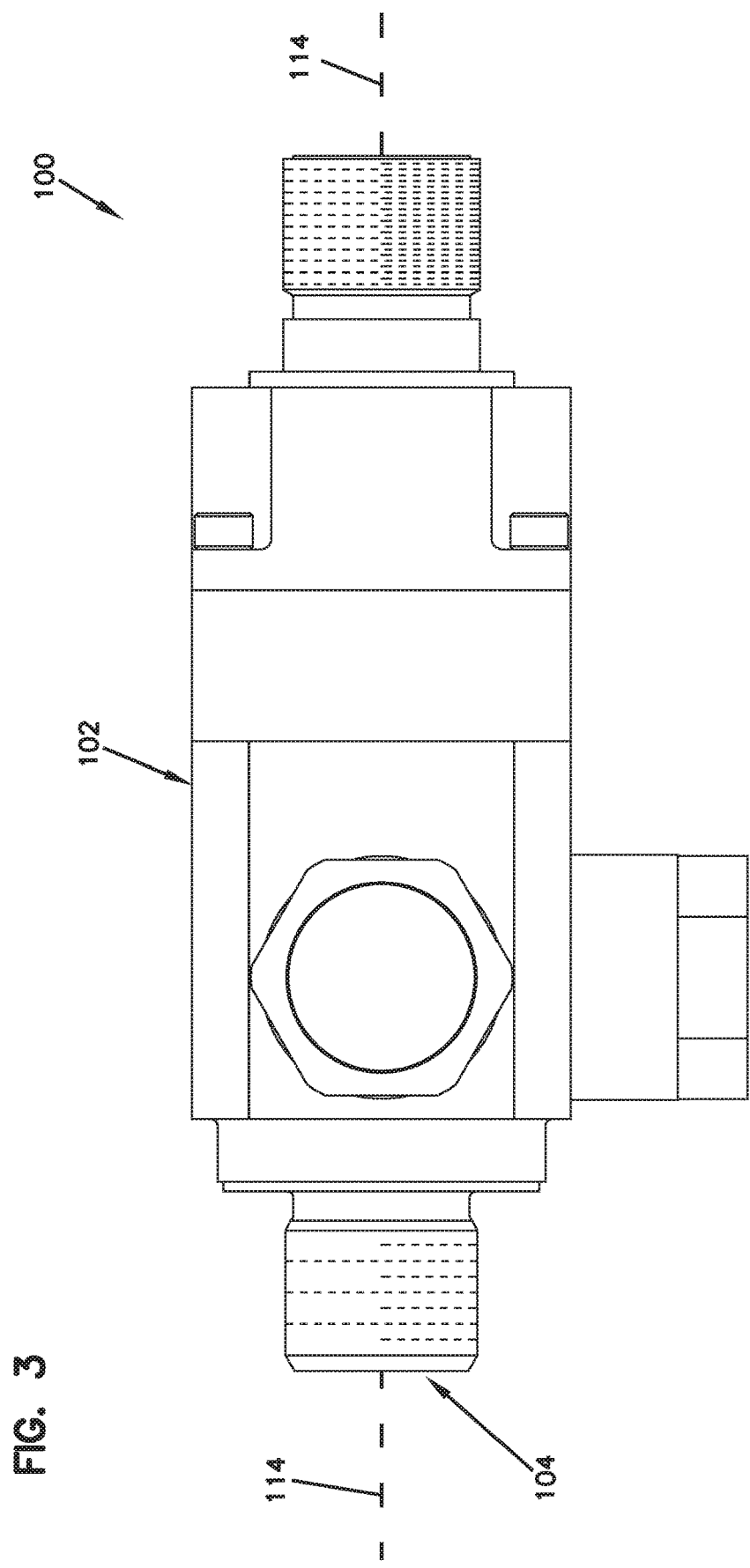
FIG. 3 is a schematic view taken toward a solenoid valve containing side of the bleed valve system shown in FIG. 2.
Figure 6:
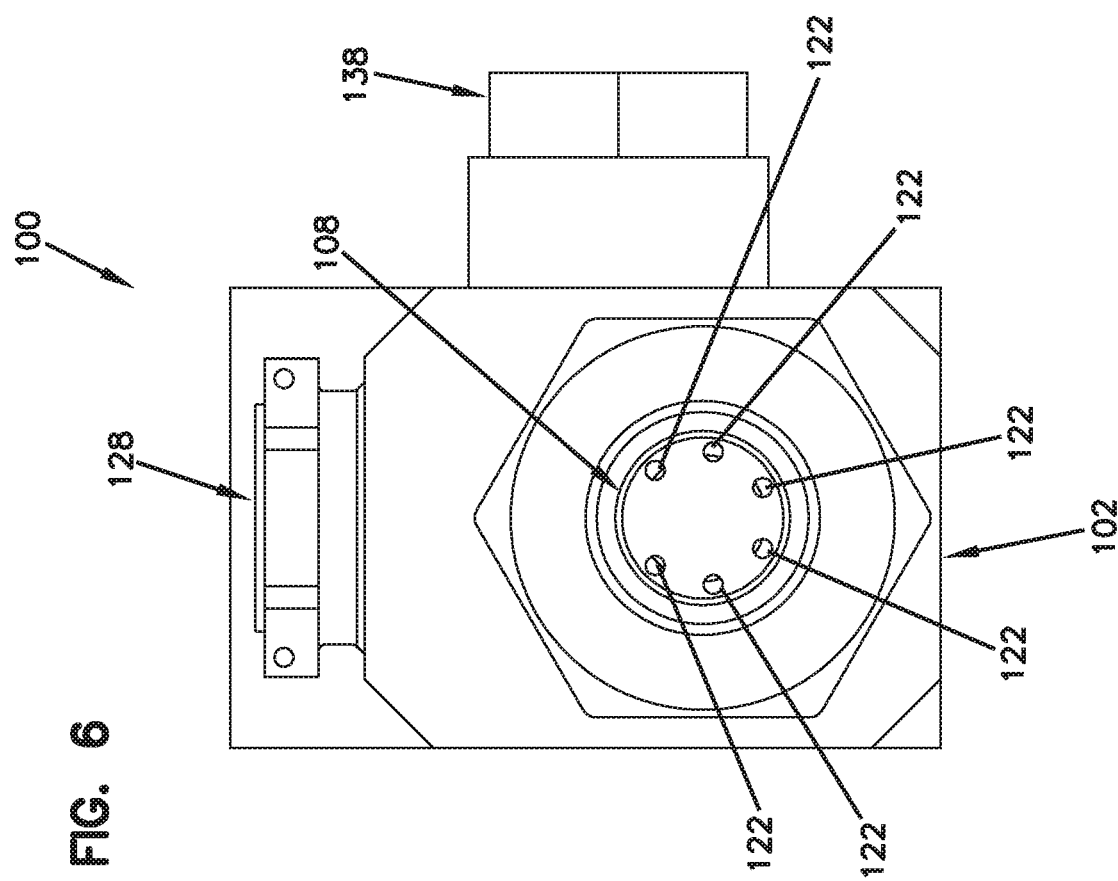
FIG. 6 is a schematic view taken toward a fluid inlet side of the bleed valve system shown in FIG. 2.
Figure 5:
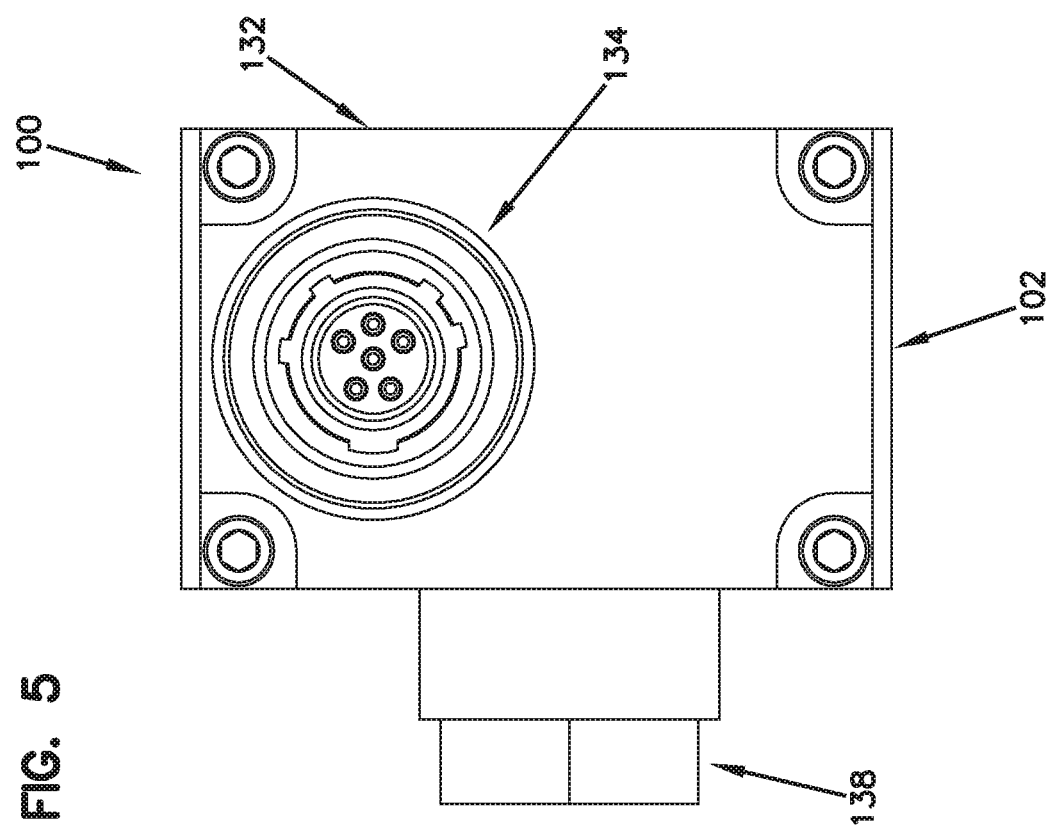
FIG. 5 is a schematic view taken toward a fluid level sensor side or electrical connector side of the bleed valve system shown in FIG. 2.

FIG. 3 is a schematic view of the bleed valve system rotated 90 degrees around axis 114 relative to FIG. 2. FIG. 4 is a schematic view of the bleed valve system 100 rotated 180 degrees around axis 114 relative to FIG. 3. FIG. 5 is a schematic view taken toward a fluid level sensor side of the bleed valve system 100 shown in FIG. 2. FIG. 6 is a schematic view taken toward a fluid inlet side of the bleed valve system 100 shown in FIG. 2.

Figure 7:
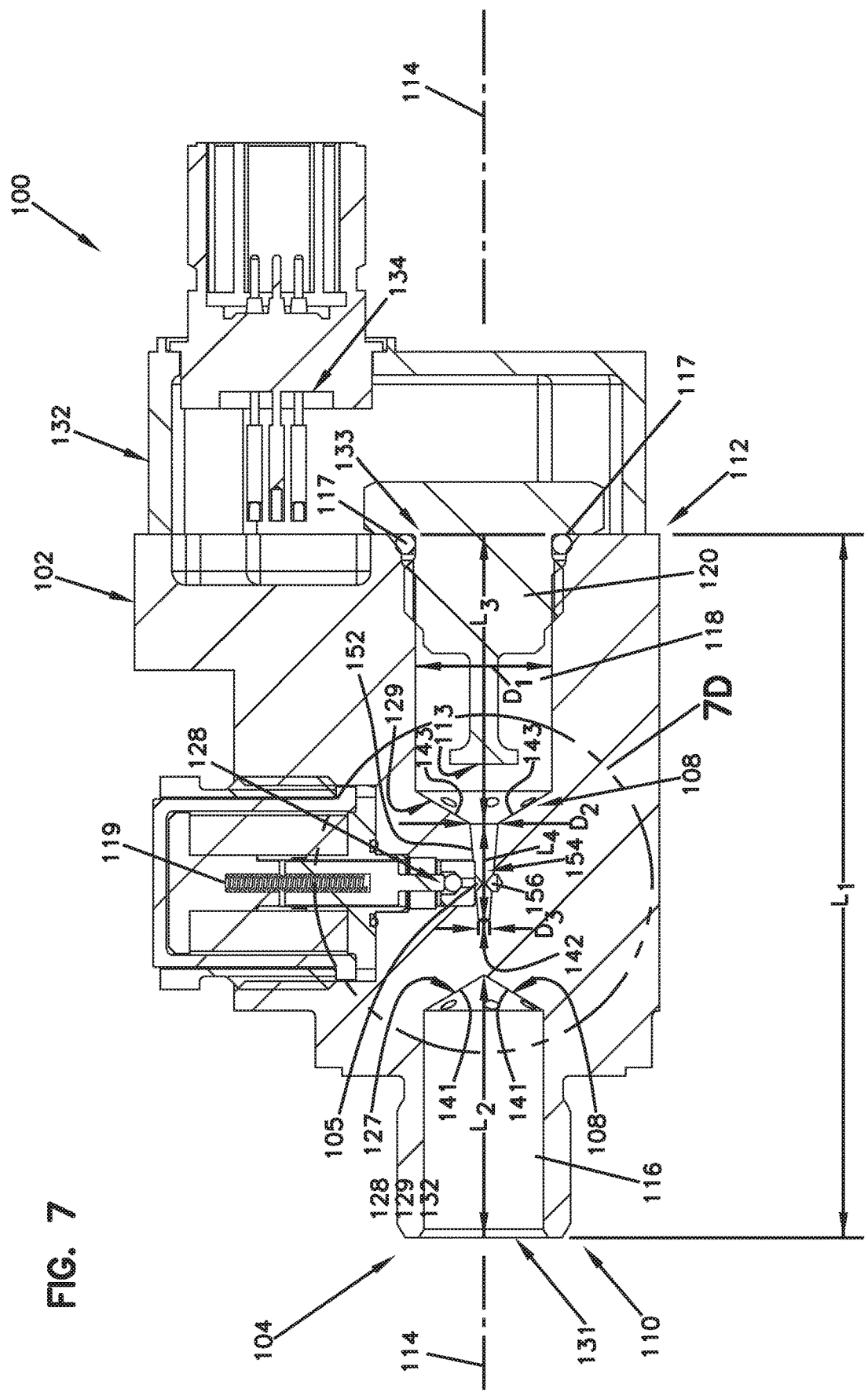
FIG. 7 is a schematic cross-sectional view of the bleed valve system shown in FIG. 2.

Referring now to FIG. 7, a schematic cross-sectional view of the bleed valve system 100 is shown. The housing 102 of the example bleed valve system 100 includes: a reservoir chamber end 110 with a reservoir chamber 116; a bleed chamber end 112 with a bleed chamber 118; a fluid bleed conduit 106, typically, an air bleed conduit; and a fluid conduit arrangement 108, typically, an air/liquid conduit arrangement; although alternatives are possible. The example housing 102 defines a mounting axis 114 (in the example a generally horizontal axis) extending therethrough. In the example depicted, the mounting axis 114 is shown in extension through both the reservoir chamber 116 and the bleed chamber 118.

The example fluid conduit arrangement 108 shown provides for flow of a fluid of a first, lower, specific gravity and a fluid of a second, higher, specific gravity from the reservoir chamber 116 to the bleed chamber 118. In use, fluid enters the reservoir chamber 116 and flows through the fluid conduit arrangement 108 to fill the bleed chamber 118. A fluid of a first, lower, specific gravity can enter the bleed chamber 118 at a location above or below a lower most portion of an open end 124 of the fluid bleed conduit 106; and fluid of a second, higher, specific gravity can enter the bleed chamber 118 at a location above or below the lower most portion of the open end 124 of the fluid bleed conduit 106. The difference between the fluid of the first, lower, specific gravity and the fluid of the second, higher, specific gravity is sufficient such that the fluids will separate in the environment of operation. Once a fluid level in the bleed chamber 118 is down or falls below a selected level, typically a fluid of a first, lower, specific gravity will enter the bleed chamber 118 at a location above a lower most portion of the open end 124 of the fluid bleed conduit 106. Of course, an example would be an air/liquid system when the unit is an air bleed valve assembly, such as a hydraulic liquid system. Over time, excess fluid of the first, lower, specific gravity, from the pressurized fluid system (for example the hydraulic system on which the bleed valve system 100 is mounted) will build up in the bleed chamber 118. In the example depicted, the fluid of lower specific gravity can be air, and the fluid of higher specific gravity can be liquid.

An example fluid level sensor 120 is shown mounted to the housing 102 to detect a level of fluid (typically of the higher specific gravity) in the bleed chamber 118. When the fluid level detected falls below a selected level, as a result of fluid of lower specific gravity build-up in the housing 102, the fluid of lower specific gravity in the bleed chamber 118 can communicate with the fluid bleed conduit 106. The fluid level sensor 120, then, directs a solenoid valve 128 to open to let a fluid of lower specific gravity (i.e. the air) to vent: through the fluid bleed conduit 106; then through valve seat 130, opened by the solenoid valve 128, and outwardly from the housing 102. In due course, when sufficient bleed of a fluid of lower specific gravity has occurred, the solenoid valve 128 closes.

As described above, the bleed valve system 100 is configured to operate without the shortcomings of the bleed valve assembly 10 depicted in FIG. 1 related to vertical orientations. This is accomplished by several features of the bleed valve system 100 described below with reference to FIG. 7D.

First, although alternatives are possible, the example fluid bleed conduit 106 is shaped and located to extend from the open end 124 in direct communication with the bleed chamber 118 toward, but not completely to, the reservoir chamber 116. Herein, the term "direct communication" is generally used to relate two features or components in a variety of situations. Specifically, the term "direct communication" is used to describe two features or components that are directly connected with nothing in-between them. Typically the fluid bleed conduit 106 is positioned in the housing 102 with the mounting axis 114 extending longitudinally therethrough; and the solenoid valve 128 is configured to communicate with the fluid bleed conduit 106 at a location 109 remote from the bleed chamber 116 and, of course, the reservoir chamber 118.

Second, the open end 124 of the fluid bleed conduit 106 in direct communication with the bleed chamber 118, is located such that it will be above a selected fluid detection level 126 in the bleed chamber 118 in any (and every) selected orientation resulting from a 360° rotation of the housing 102 around the mounting axis 114. The term "selected fluid detection level" 126 as used herein in this context refers to the level at, or below which, the fluid level sensor 120 is set to recognize that the level of fluid of higher specific gravity is low enough so that bleed of a fluid of lower specific gravity is desired, and/or at, or above which, the fluid level sensor 120 is set to recognize that the level of fluid of higher specific gravity is high enough so that bleed of a fluid of lower specific gravity is not desired.

Third, the fluid conduit arrangement 108 is configured to transport fluid from the reservoir chamber 116 to the bleed chamber 118 such that fluid can enter the bleed chamber 118 at a location below a lowest most portion of the open end 124 of the fluid bleed conduit 106 and indeed below the selected fluid detection level 126 at any and all selected positions (or orientations) around the mounting axis 114. Also, the fluid conduit arrangement 108 is configured to transport fluid from the reservoir chamber 116 to the bleed chamber 118 such that fluid can enter the bleed chamber 118 at a location above a lower most portion of the open end 124 of the fluid bleed conduit 106 and indeed above the selected fluid detection level 126 at any and all selected positions (or orientations) around the mounting axis 114.

Figure 7A:
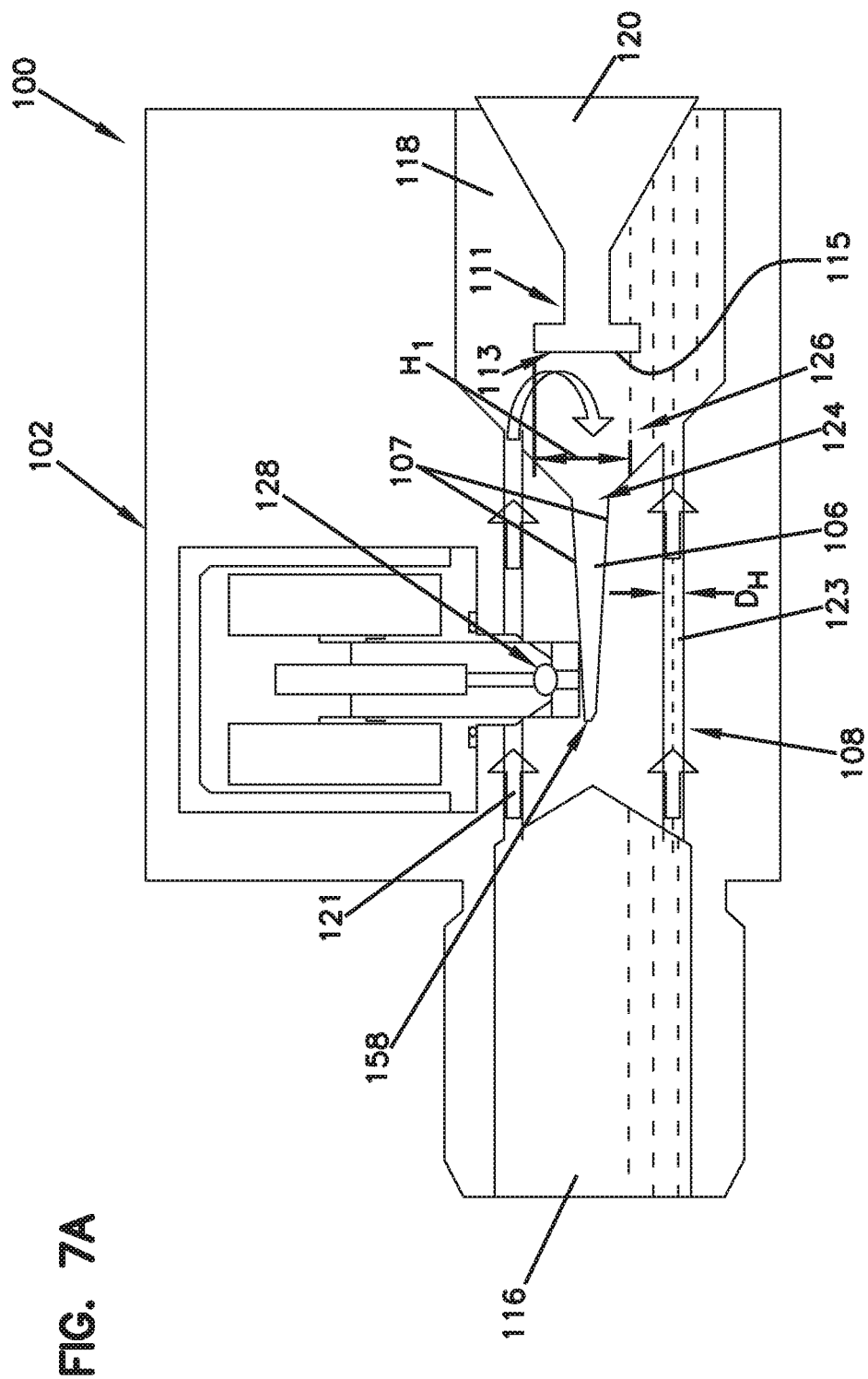
FIG. 7A is a schematic view of the bleed valve system shown in FIG. 2 depicting operation of a conduit flow arrangement in accord with the principles of the present disclosure.
Figure 7B:
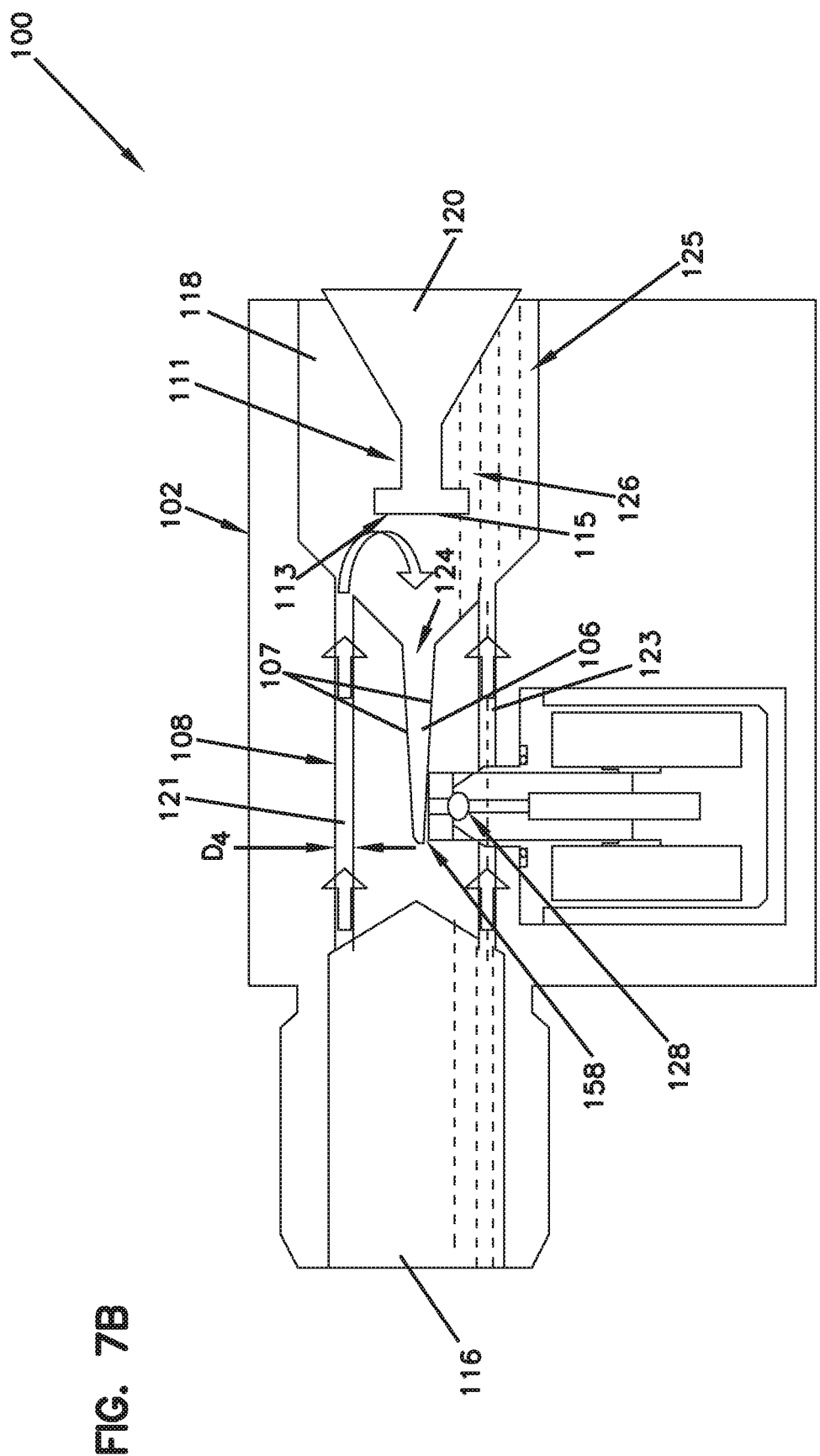
FIG. 7B is a schematic view of the bleed valve system shown in FIG. 7A depicting the solenoid valve axially rotated, relative to FIG. 7A, with operation still in accord with the principles of the present disclosure.

It can be understood how these three features cooperate to provide for the desired function by referring to FIGS. 7A and 7B. FIGS. 7A and 7B are schematic views that show the bleed valve system 100 of FIG. 7 in operation.

Referring to FIG. 7A, the example bleed valve system 100 is shown rotated around the mounting axis 114, FIG. 7, with the solenoid valve 128 oriented and positioned above the bleed chamber 118. In this example, both a fluid of a first, lower, specific gravity 121 and a fluid of a second, higher, specific gravity 123 are shown flowing from the reservoir chamber 116 to the bleed chamber 118. As shown, a fluid of a first, lower, specific gravity 121 is flowing above the selected fluid detection level 126 and a fluid of a second, higher, specific gravity 123 is at or below the selected fluid detection level 126. (Of course fluids of both lower and higher specific gravity can be mixed and flow through above and below the selected fluid detection level 126, with separation occurring in the bleed chamber 118). In the example shown, a fluid of the first, lower, specific gravity 121 is air and a fluid of the second, higher, specific gravity 123 is liquid. Of course, alternatives are possible.

Generally, when excess air builds up in the bleed chamber 118, the fluid level sensor 120 can no longer detect the fluid as being at least at the selected fluid detection level 126. The fluid level sensor 120 sends a signal, for example through an electronic control mechanism 132, to the solenoid valve 128 (e.g., air vent valve) to allow the air to vent through the fluid bleed conduit 106, for example to the atmosphere. Again, because the bleed valve system 100 is under pressure of the pressurized fluid system to which it is mounted, the internal pressure, often at least 60 pound-force per square inch (psi) or 414 kilopascal (kPa), (usually greater than 70 psi or 483 kPA), will very quickly vent the air from the bleed valve system 100.

In FIG. 7B, a schematic view of the example bleed valve system 100 is shown with the housing 102 rotated 180° around the mounting axis 114, FIG. 7, so that the bleed valve system 100 is inverted relative to FIG. 7A. Now, the solenoid valve 128 is directed downward. However, it can be seen that the fluid bleed conduit 106 is still generally horizontal. The fluid level is in a different place within the bleed chamber 118, but it is still at the selected fluid level 126 above a lower most portion 125 of the bleed chamber 118. As shown, a fluid of a first, lower, specific gravity 121 can still flow through from the reservoir chamber 116 to the bleed chamber 118 above the selected liquid detection level 126. Again, because the bleed valve system 100 is under pressure of the pressurized fluid system to which it is mounted, the internal pressure will very quickly vent a fluid of a first, lower, specific gravity 121 from the bleed valve system 100.

As a fluid of a first, lower, specific gravity 121 presence increases, the fluid level sensor 120 sends a signal to the solenoid valve 128 (e.g., air vent valve) to allow a fluid of a first, lower, specific gravity 121 to flow through the fluid bleed conduit 106, then through the valve seat 130, opened by the solenoid valve 128 and out to the atmosphere, although alternatives are possible.

Thus, it is clear from these two extremes, that the bleed valve system 100 will operate anywhere between the two 180° opposite vertical orientations. In other words, the operation of the bleed value system 100 is the same with no impact in regard to the orientation around the mounting axis 114.

Selected Features and Optional Variations

In this section, some example specific features are described. Of course, variations are possible in accord with the presently described techniques. There is no requirement that an assembly, component, feature, or method be applied with all of the features described or depicted herein, in order to obtain some advantage according to the present disclosure.

Figure 7D:
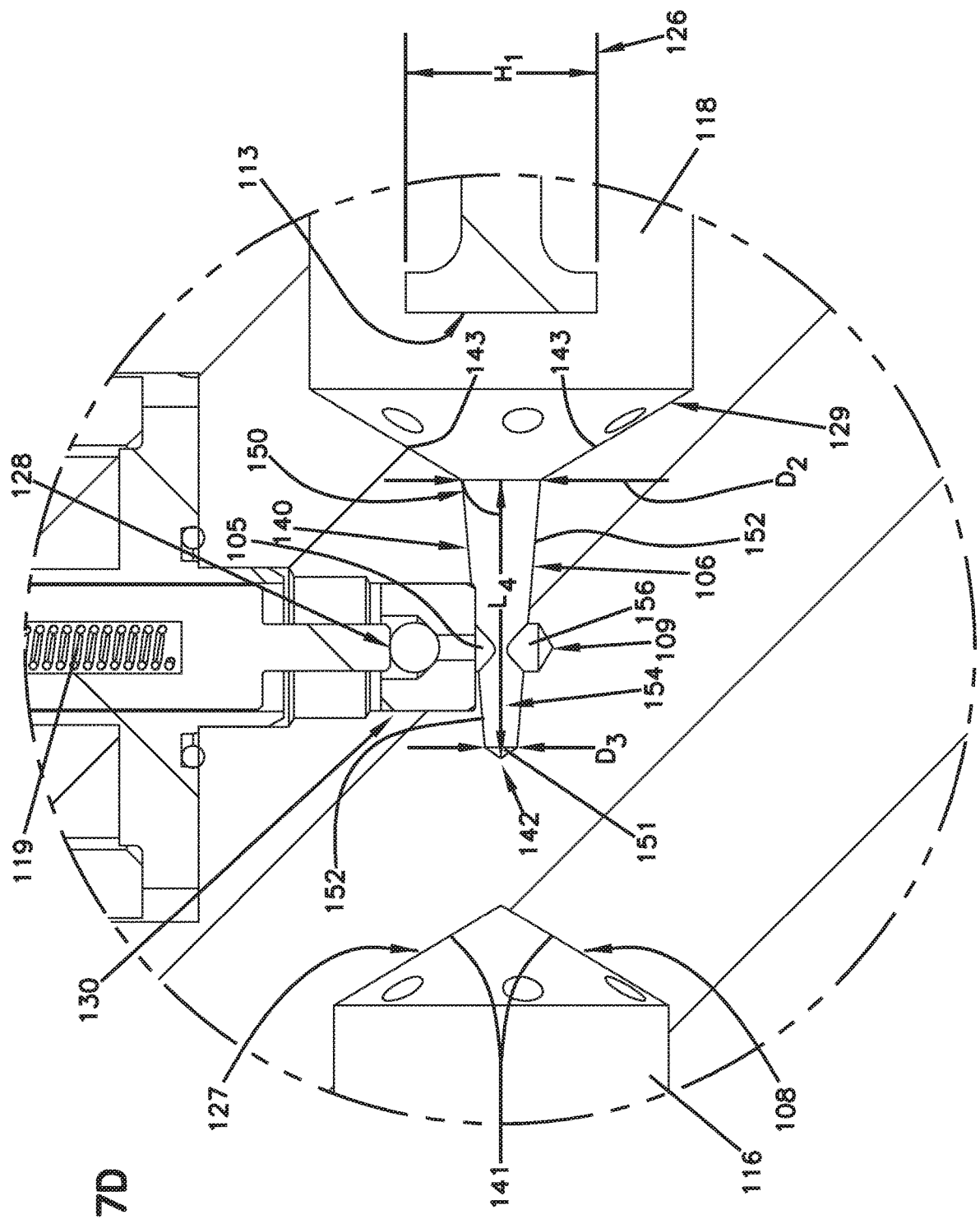
FIG. 7D is a schematic enlarged view of a portion of FIG. 7.

A. The Reservoir Chamber 116 and the Bleed Chamber 118; FIG. 7, 7D

The example reservoir chamber 116 and bleed chamber 118 can be varied, for example, in cross-sectional shape, length, cross-dimension, and location.

The example reservoir chamber 116 and the bleed chamber 118 depicted in FIG. 7 each has a circular cross-sectional shape in a plane perpendicular to the mounting axis 114, although alternatives are possible. The optional circular cross-sectional shape of the reservoir chamber 116 and the bleed chamber 118 is advantageous for two reasons. First, the cross-sectional shape of the reservoir chamber 116 and the bleed chamber 118 can be easy to make, for example when the housing is made as a metal component, since the circular reservoir chamber 116 and the bleed chamber 118 can be made by a bore or drill. Second, the circular cross-sectional shape is advantageous because when the reservoir chamber 116 and the bleed chamber 118 are centered on the mounting axis 114, it will provide for a consistent selected liquid detection level at any final position or selected orientation around the mounting axis 114.

The example reservoir chamber 116 and the bleed chamber 118 each has smooth outer sidewall sections 141 and 143 respectively, that extend generally parallel to the mounting axis 114, although alternatives are possible. The advantage of the smooth sidewall sections 141 and 143 is that it provides for consistency of operation in any final position or selected orientation around the mounting axis 114. Also, the smooth sidewalls are easy to make because they can be constructed with a bore or drill.

The reservoir chamber 116 and the bleed chamber 118 depicted each has a shape that includes a tapered inner end; see for example end 127 of the reservoir chamber 116 and end 129 of the bleed chamber 118. In a typical construction in which the reservoir chamber 116 and the bleed chamber 118 are bored, such tapered inner ends 127, 129 would result, alternatives are possible.

In the depicted example, the housing 102 has a total length $L_1$ in the direction of the mounting axis 114; $L_1$ being the length from entry end 131 of mounting port 104 to open end 133 of the bleed chamber 118 (closed by the mounted liquid level sensor 120).

The reservoir chamber 116 has a length $L_2$ in the direction of the mounting axis 114. Variations of the length $L_2$ are possible. Typically, the length $L_2$ of the reservoir chamber 116, between the entry end 131 of the mounting port 104 and the end 127 of the reservoir chamber 116, is at least 10% of the length $L_1$ of the housing 102. Usually, the length $L_2$ of the reservoir chamber 116 is at least 20% of the length $L_1$ of the housing 102. Typically, the length $L_2$ of the reservoir chamber 116 is no more than 50% of the length $L_1$ of the housing 102. Often, the length $L_2$ of the reservoir chamber 116 is no more than 40% of the length $L_1$ of the housing 102. Usually, the length $L_2$ of the reservoir chamber 116 is no more than 30% of the length $L_1$ of the housing 102. Of course, in other examples, the length $L_2$ of the reservoir chamber 116 relative to the length $L_1$ of the housing 102 may be varied.

The bleed chamber 118 has a length $L_3$ in the direction of the mounting axis 114. Variations of the length $L_3$ are possible. Typically, the length $L_3$ of the bleed chamber 118, between the open end 124 of the fluid bleed conduit 106 and the bleed chamber end 112, is at least 10% of the length $L_1$ of the housing 102. Usually, the length $L_3$ of the bleed chamber 118 is at least 20% of the length $L_1$ of the housing 102. Typically, the length $L_3$ of the bleed chamber 118 is not more than 50% of the length $L_1$ of the housing 102. Often, the length $L_3$ of the bleed chamber 118 is no more than 40% of the length $L_1$ of the housing 102. Usually, length $L_3$ of the bleed chamber 118 is no more than 30% of the length $L_1$ of the housing 102. Alternative ratios of the length $L_3$ of the bleed chamber 118 relative to the length $L_1$ of the housing 102 are possible.

In the depicted example, the reservoir chamber 116 and the bleed chamber 118 have similar cross-dimensions $D_1$, although alternatives are possible in which the cross-dimensions $D_1$ of the two chambers 116, 118 may vary. Typically, the cross-dimension $D_1$ of the reservoir chamber 116 and the bleed chamber 118 is at least 10 mm (millimeters), although variations are possible. Typically, the cross-dimension $D_1$ is at least 20 mm. Often, the cross-dimension $D_1$ is at least 30 mm. Usually, the cross-dimension $D_1$ is no more than 60 mm, although variations are possible. Typically, the cross-dimension $D_1$ is no larger than 50 mm. Usually, cross-dimension $D_1$ is no larger than 40 mm.

B. The Fluid Bleed Conduit 106; FIG. 7, 7D

Although alternatives are possible, the example fluid bleed conduit 106, i.e. the fluid bleed conduit 106 in direct communication with the bleed chamber 118 and extending toward the reservoir chamber 116, has a cross-sectional shape in a plane perpendicular to a central axis thereof, in the example corresponding to mounting axis 114, that is typically circular for convenience and ease of construction. The optional circular cross-sectional shape is advantageous because it can be easily made by a bore or drill and it provides for a consistent operation at any rotational orientation around the mounting axis 114. Of course, alternative shapes are possible.

Although alternatives are possible, the fluid bleed conduit 106 (FIG. 7D) has a somewhat conical shape with a taper forming portion 140 with inclined sides that taper outwardly toward the bleed chamber 118. The taper forming portion 140 of the fluid bleed conduit 106 defines a half angle 150 between sidewalls 152 of the fluid bleed conduit 106 and a centerline 154 of the fluid bleed conduit 106. Typically, the half angle 150 is at least 5°, although variations are possible. Usually, the half angle 150 is at least 10°. Often, the half angle 150 is no more than 20°, but alternatives are possible. A conical angle 151 can be defined across the fluid bleed conduit 106 between sidewalls 152. Of course, the conical angle 151 is typically twice the half angle 150.

An advantage of the conical shape with the taper forming portion 140 of the fluid bleed conduit 106, is that it accommodates existing equipment by allowing the bleed valve system 100 to be mounted even when it is not exactly horizontal, with the taper still allowing fluid in fluid bleed conduit 106 to drain out. This is because the fluid bleed conduit 106 includes the half angle 150, which allows it to be mounted off the mounting axis 114. Therefore, the bleed valve assembly 100 can be manufactured to a specification that allows for an alternate from a precisely horizontal mount.

The taper forming portion 140 may gradually decrease in cross-dimension from a first cross-dimension $D_2$ at the open end 124 of the fluid bleed conduit 106 to a second cross-dimension $D_3$ at a terminating point 142 thereof. Typically, the first cross-dimension $D_2$ is at least 0.5 times the second cross-dimension $D_3$. Usually, the first cross-dimension $D_2$ is at least 2.0 times the second cross-dimension $D_3$. Often, the first cross-dimension $D_2$ is no more than 3.0 times the second cross-dimension $D_3$. Of course, alternate ratios of the first cross-dimension $D_2$ to the second cross-dimension $D_3$ of the fluid bleed conduit 106 are possible in many applications.

In the depicted example, the cross-dimension $D_1$ of the reservoir chamber 116 and bleed chamber 118 is at least 4.0 times the cross-dimension $D_2$ of the fluid bleed conduit 106.

Typically, the second cross-dimension $D_3$ of the fluid bleed conduit 106 is at least 1.0 mm. Often, the second cross-dimension $D_3$ of the fluid bleed conduit 106 is at least to 5 mm. Usually, the second cross-dimension $D_3$ of the fluid bleed conduit 106 is no more than 10.0 mm. Of course, alternatives are possible in many applications.

The fluid bleed conduit 106 has a length $L_4$ that extends in the direction of the mounting axis 114. Typically, the length $L_4$ of the fluid bleed conduit 106 is at least 5% of the length $L_1$ of the housing 102. Usually, the length $L_4$ of the bleed chamber 118 is at least 10% of the length $L_1$ of the housing 102. Typically, the length $L_4$ of the bleed chamber 118 is no more than 40% of the length $L_1$ of the housing 102. Often, the length $L_4$ of the bleed chamber 118 is no more than 30% of the length $L_1$ of the housing 102. Usually, length $L_4$ of the bleed chamber 118 is no more than 20% of the length $L_1$ of the housing 102. Of course, alternate ratios of the length $L_4$ of the bleed chamber 118 relative to the length $L_1$ of the housing 102 are possible.

In the depicted example, the fluid bleed conduit is adjacent to the bleed chamber 118 and centrally aligned thereto. As described above, the fluid bleed conduit 106 is centered on the mounted axis 114 which is convenient for consistency of operation and 360° rotation. The advantage is that no matter how the bleed valve system 100 is rotated, the fluid bleed conduit 106 will still be centered on the mounting axis 114.

Although alternatives are possible, the example fluid bleed conduit 106 depicted has smooth inclined walls 107 (see FIG. 7A, 7B) that form the taper forming portion 140 except at the location 109 where the solenoid valve 128 intercepts the fluid bleed conduit 106. Alternative variations of the smooth inclined walls 107 are possible. The smooth inclined walls 107 are advantageous because they can be easily made by a bore or drill, and also provide for a consistent operation in any final position or selected orientation around the mounting axis 114.

C. The Port 105 to Solenoid Valve 128; FIG. 7, 7D

The port 105 provides communication between the fluid bleed conduit 106 and the solenoid valve 128. Typically, the port 105 is located, spaced from the bleed chamber 118, at least 40% along the length $L_4$ of the fluid bleed conduit 106. Usually, the port 105 is located at least 50% along the length $L_4$ of the fluid bleed conduit 106 from the bleed chamber 118.

Typically, the port 105 intercepts the fluid bleed conduit 106 at a right angle to the mounting axis 114 for convenience and ease of construction, although alternative intercepting angles are possible. Also, it is noted that where the interception occurs there may be an irregularity 156 in the sidewall 152 of the fluid bleed conduit 106 which would typically be an artifact from drilling the fluid bleed conduit 106, but alternatives are possible.

D. The Selected Fluid Detection Level 126 and the Fluid Level Sensor 120; FIG. 7, 7D In certain examples, the fluid level sensor 120 may be an optical sensor that uses a photoelectric sensor such as a phototransistor and light emitting diodes LEDs to detect the level of fluid within the bleed chamber 118. Of course, different types of fluid level sensing systems may be used, for example, fluid contact sensors (i.e., acoustic wave sensors).

Typically, the fluid level sensor 120 is mounted or inserted in the bleed chamber end 112 to seal or close off the bleed chamber 118 with seal 117, alternatives are possible.

The example fluid level sensor 120 depicted has a frontal face portion 113 adjacent to the open end 124 of the fluid bleed conduit 106. Although alternatives are possible, the frontal face portion 113, of the example, has a planar surface 115 provided to detect the selected fluid detection level 126 in the bleed chamber 118. Typically, when planar, the frontal face portion 113 of the fluid level sensor 120 is in a plane perpendicular to the mounting axis 114 and is centered on the mounting axis 114. This provides that (unlike the liquid level sensor 14 of the bleed valve assembly 10, FIG. 1) no matter how the fluid level sensor 120 is rotated about the mounting axis 114, it can be properly positioned to detect a fluid level, but alternatives are possible. Of course, the example fluid detection level 126 shown in this assembly is defined on a circular pattern, which allows it to remain in the lowest part of the bleed chamber 118 in any final position or selected orientation, no matter how the bleed valve assembly 100 is rotated.

Typically, the frontal face portion 113 of the fluid level sensor 120 has a dimension of (height) $H_1$, FIG. 7D, that is at least 2 mm (millimeters), although variations are possible. Often, the dimension of (height) $H_1$ is at least 10 mm, although alternatives are possible. Usually, the height $H_1$ is no more than 30 mm, although variations are possible.

In the depicted example, the dimension of (height) $H_1$ of the face portion 113 is at least 50% of a dimension across the bleed chamber 118 during a 360° rotation, but alternatives are possible. Usually, the dimension of (height) $H_1$ of the face portion 113 is at least 70% across the bleed chamber 118 during a 360° rotation, although alternatives are possible. Typically, the dimension of (height) $H_1$ of the face portion 113 is no more than 90% across the bleed chamber 118 in any selected orientation resulting from a 360° rotation of the housing around the mounting axis 114, although alternatives are possible.

E. The Fluid Conduit Arrangement 108

Figure 8:
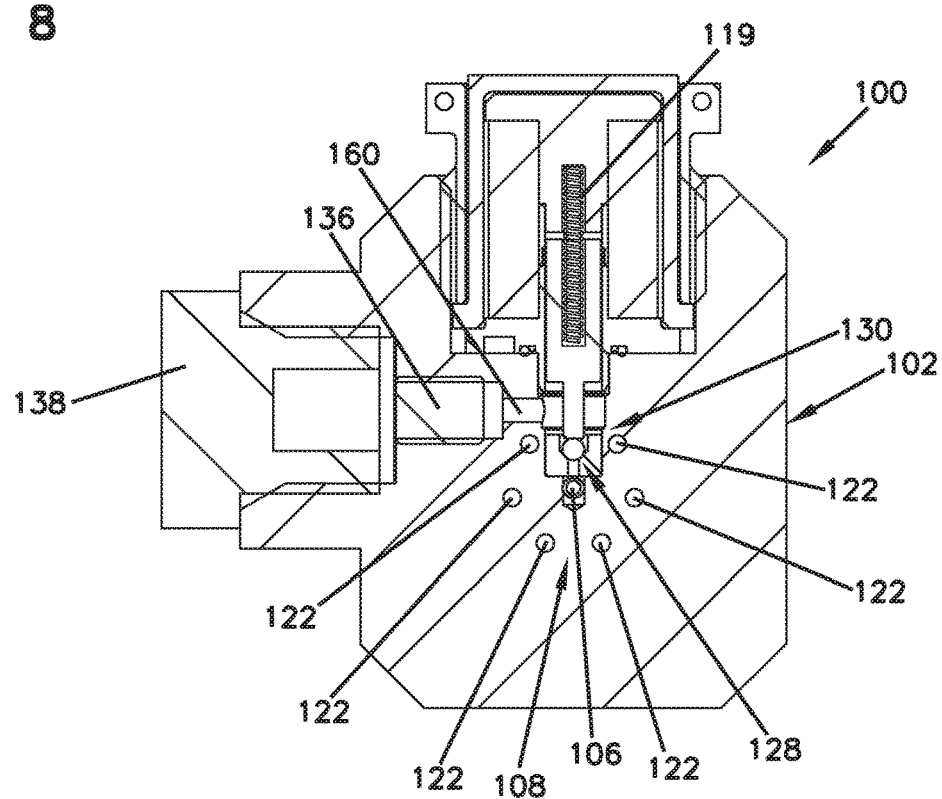
FIG. 8 is a schematic cross-sectional view of the fluid level sensor side or electrical connector side of the bleed valve system shown in FIG. 5.
Figure 9:
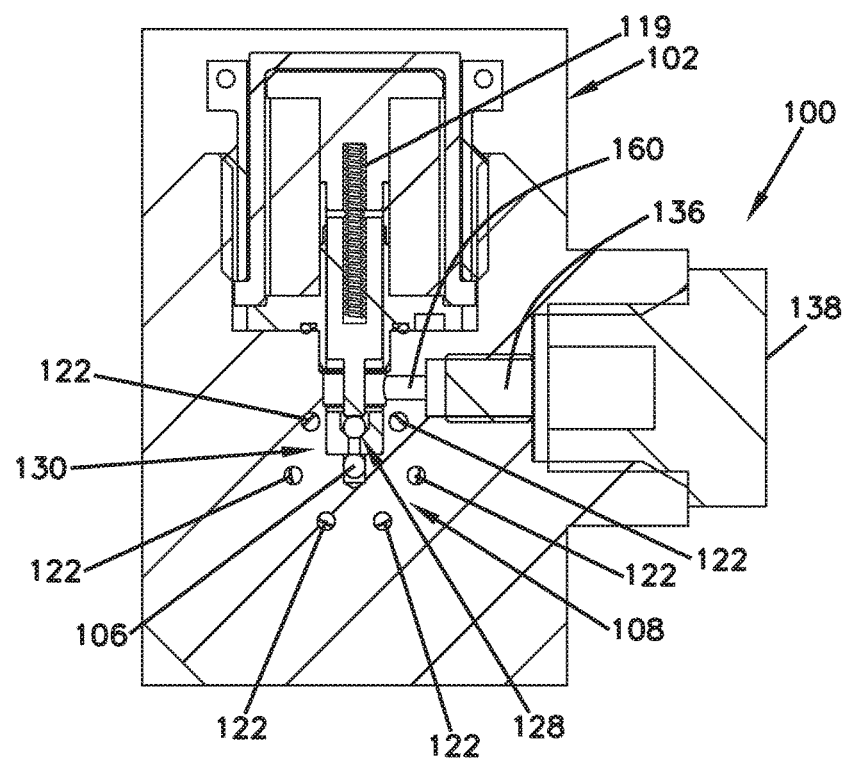
FIG. 9 is a schematic cross-sectional view of a fluid inlet side of the bleed valve system shown in FIG. 6.

Referring to FIGS. 8-9, typically, the fluid conduit arrangement 108 includes multiple channels or ports 122, although alternatives are possible. For example, at least one channel or port 122 appropriately shaped can be used. Usually, the fluid conduit arrangement 108 includes at least 3 ports that are appropriately arranged. Typically, the fluid conduit arrangement 108 would include no more than 9 ports, but alternatives are possible.

Typically, the channels or ports 122 will extend, in extension between the reservoir chamber 116 and the bleed chamber 118, along a path parallel to the mounting axis 114 for ease of construction and consistency of operation in any final position or selected orientation resulting from a 360° rotation of the housing around the mounting axis 114, although alternatives are possible.

Typically, the channels or ports 122 of the fluid conduit arrangement 108 are cylindrically shaped with smooth sides, since these are convenient to assemble, but alternatives are possible. The channels or ports 122 may (optionally) be evenly spaced (except, of course, around the operation and features of the solenoid valve 128) around the mounting axis 114, but this is not required.

Typically, each channel or port 122 in the fluid conduit arrangement 108, when a cylindrical channel or port is used, has a cross-dimension $D_4$ (see FIG. 7A, 7B) that is at least 0.05 mm, but alternatives are possible. Usually, the cross-dimension $D_4$ is at least 2 mm. Often, the cross-dimension $D_4$ is no more than 5 mm, although alternatives are possible.

The example bleed valve assembly 100, FIG. 6, has 6 channels or ports 122 in the fluid conduit arrangement 108, spaced around the mounting axis 114, FIG. 7, so that no matter how the bleed valve assembly 100 is rotated around the mounting axis 114, at least several of the channels or ports 122 are above the selected fluid detection level 126 and at least several of the channels or ports 122 are below the selected fluid detection level 126 in a final position or selected orientation.

As an example alternative, in FIG. 7C, an example bleed valve system 100 is depicted schematically having 5 channels or ports 122 in the fluid conduit arrangement 108, spaced around the mounting axis 114, FIG. 7, so that no matter how the bleed valve assembly 100 is rotated around the mounting axis 114, at least several of the channels or ports 122 are above and at least several of the channels or ports 122 are below the selected fluid detection level 126 when in a final position or selected orientation.

F. The Solenoid Valve 128; FIG. 7, 7D

Typically, the solenoid valve 128 is a stepper motor, but it may be any other type of opening and closing valve whose state is electronically controlled.

The solenoid valve 128 remains closed, for example, under biasing pressure by a biasing arrangement 119 (e.g., a spring) until a signal is generated by the fluid level sensor 120 to cause it to open. Upon actuation, the solenoid valve 128 remains open until a sufficient amount of air is vented outside of the housing 102, at which point the solenoid valve 128 closes. In an example system, the fluid level sensor 120 can generate another signal, for example through the electronic control mechanism 132, to close the solenoid valve 128 once the fluid level rises sufficiently (i.e., after bleed). In other examples, the electronic control mechanism 132 can be configured with a timed cycle to cause the solenoid valve 128 to close after a predetermined time period is reached.

Typically, the solenoid valve 128 is connected to the fluid bleed conduit 106 with little entrapment space therebetween, see space 158, FIGS. 7A, 7B. Often, the solenoid valve 128 includes a valve seat 130 that is circular in cross-sectional shape, alternative shapes are possible. The valve seat 130 defines a fluid passage that extends therethrough where fluid flows. Once the fluid leaves the solenoid valve 128 it passes through a vent 160, for example. Usually, the solenoid valve 128 does not have a direct communication to the channels or ports 122 of the fluid conduit arrangement 108 because at least one conduit is between them.

Turning to FIGS. 8-9, the solenoid valve 128 optionally includes a flow restrictor orifice 136 that is sized to allow all the fluid to flow quickly, but to create enough pressure to inhibit fluid of higher specific gravity from passing through.

Typically, a vent membrane 138 is mounted to the housing 102 over the vent 160 to allow fluid to flow freely in and out of the housing 102, which helps to prevent stress on seals. The vent membrane 138 includes billions of micro-pores that serve as a barrier against water, dirt and debris that can damage the internal electronics or clog the outlet to the housing 102. Typically, the vent membrane 138 equalizes the pressure and reduces condensation by allowing fluid to flow freely into and out of the housing 102.

G. The Electronic Control Mechanism 132 and the Electrical Connector 134

In FIG. 7, the solenoid valve 128 is operably connected to the electronic control mechanism 132 (e.g., controller). Typically, the example electronic control mechanism 132 shown processes the signals from the fluid level sensor 120 and generates an activation signal that is sent to the solenoid valve 128 when the excess fluid of lower specific gravity, or air, if present in a sufficient quantity, can be vented out of the reservoir chamber 116. The electronic control mechanism 132 can also be programmed with a timed cycle to cause the solenoid valve 128 to close after a predetermined time period has passed.

Turning to FIG. 5, an end view of the electrical connector 134 is shown. Generally, the example bleed valve system 100 includes an electrical connector 134. The electrical connector 134 is the power supply to the system. The electrical connector 134 is configured to supply power to the fluid level sensor 120 and the solenoid valve 128.

Although alternatives are possible, the fluid level sensor 120 and the solenoid valve 128 electronics can be integrated into various packages or it can all be integrated into one package and connected to the electrical connector 134, as in the depicted example.

H. Environmental Views and Optional Threaded Mount

Figure 10:
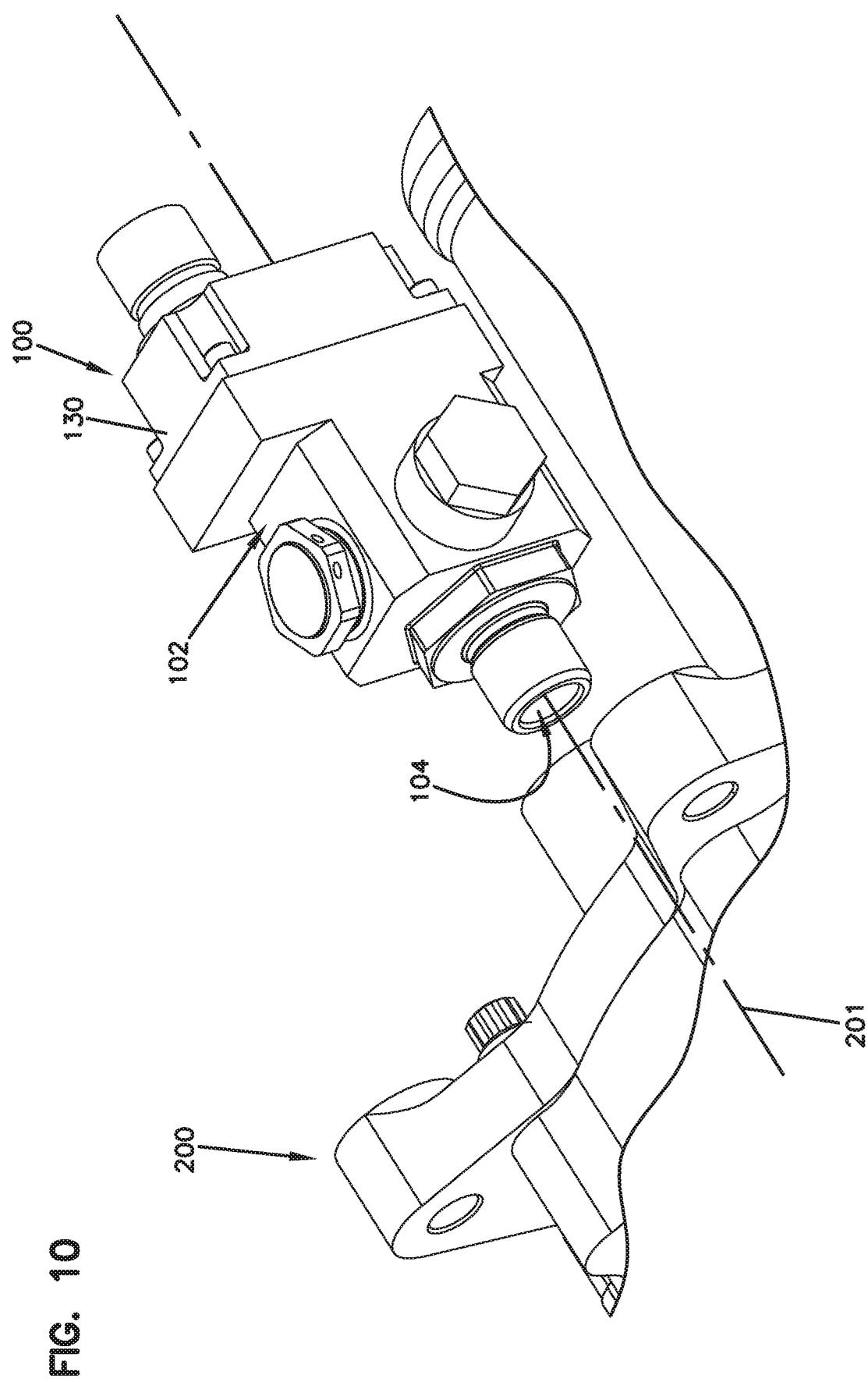
FIG. 10 is a schematic view of the bleed valve system shown in FIG. 2 prior to mounting on a pressurized fluid system.
Figure 11:
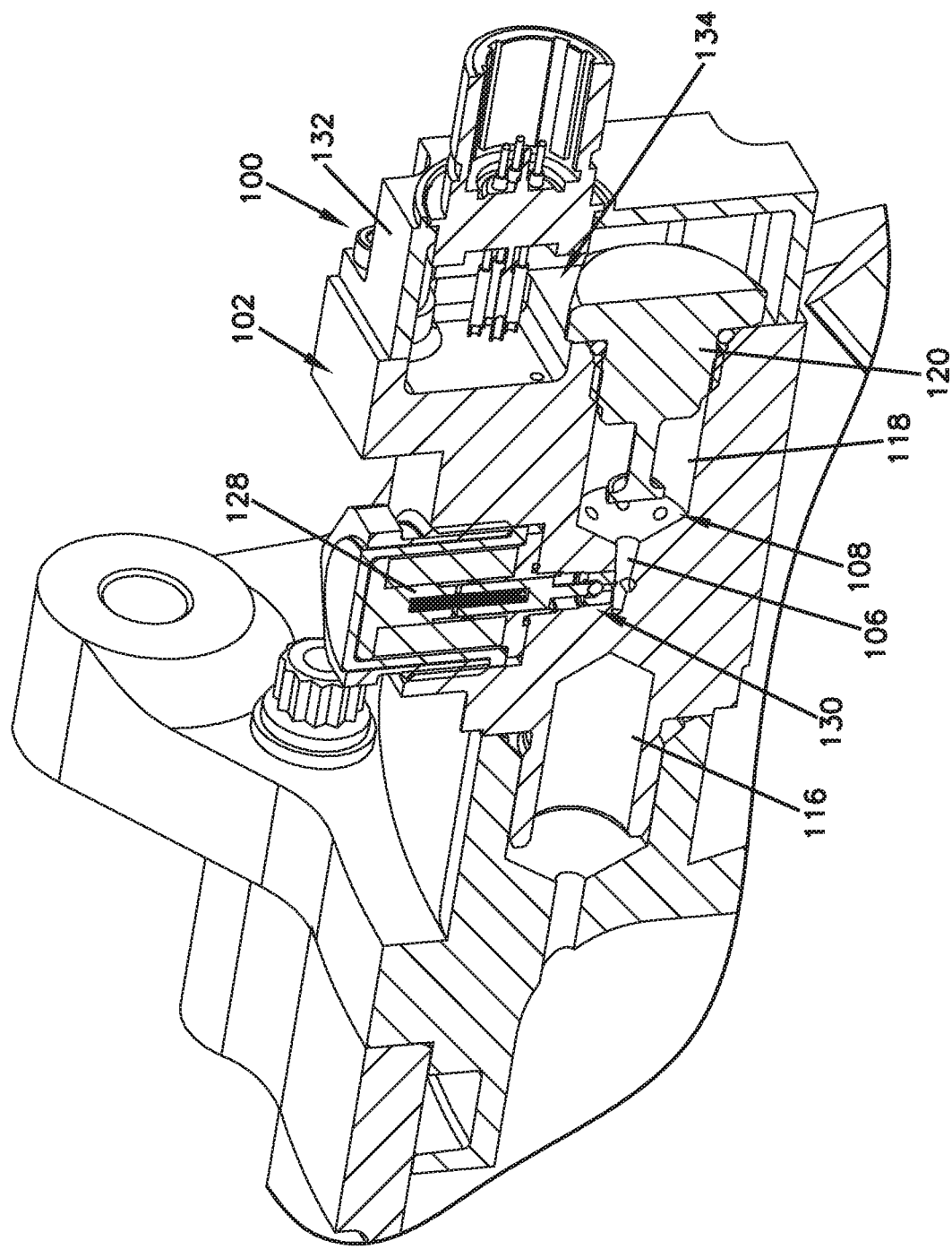
FIG. 11 is a schematic cross-sectional view of the bleed valve system shown in FIG. 10 after mounting.

Referring to FIGS. 10-11, the bleed valve system 100 is depicted mounted to a pressurized fluid system 200 (for example a hydraulic system). In the depicted example, the pressurized fluid system has a port with an axis 201. The bleed valve system 100 can be optionally mounted with the mounting port 104, for example. The example mounting port 104 depicted is a threaded mount which means that the entire bleed valve system 100 will be rotated as it is mounted. This type of design mount will work with the techniques herein because it will work no matter what orientation the bleed valve system 100 is in after the mounting is complete. Of course alternate methods of mounting can be used.

I. General Methods

In accord with the present disclosure, a method of venting a fluid of a first, lower, specific gravity, such as, air, from a fluid of higher specific gravity in a pressurized fluid system is provided. The method generally includes the step of providing for fluid flow through a fluid conduit arrangement in an assembly housing from an entrance end of the assembly housing to a bleed chamber. The method further includes selectively venting that fluid of lower specific gravity from the bleed chamber into a fluid bleed conduit in a flow direction from the bleed chamber toward the entrance end of the housing. The method can be practiced with the various features depicted and described, but alternatives are possible.

Also, according to the present disclosure provided herein, a method of venting a fluid of a first, lower, specific gravity with an automatic bleed valve assembly is provided. The method generally includes mounting an automatic bleed valve assembly with a threaded coupling by rotating the entire automatic bleed valve assembly around a mounting axis. The example method can be practiced because the techniques provided herein allow for operation of the automatic bleed valve assembly no matter what the rotational orientation is around the mounting axis. These techniques can be practiced with the specific arrangements shown, but alternatives are possible.

Again, the principles, techniques, and features described herein can be applied in a variety of systems, and there is no requirement that all of the advantageous features identified be incorporated in an assembly, system or component to obtain some benefit according to the present disclosure.

Some General Observations; Summary

The present disclosure relates to various general concepts. One concept relates to methods and techniques of mounting an automatic bleed valve assembly that involve rotating an entire housing of the bleed valve assembly around a mounting axis, for example, by a threaded connection for attachment to a fluid system. This feature allows for the bleed valve assembly to be retrofitted to existing equipment with a threaded mount, but can be used with a newly designed system.

Another concept relates to specific features of the automatic bleed valve assembly that operate independently of vertical orientation around a mounting axis. This is accomplished, for example, by having a fluid bleed conduit configured such that it can operate at all times during a 360° rotation of the housing around the mounting axis. In this summary, some selected, final summary characterizations of the teachings herein are provided. Among them are:

1. A bleed valve system for bleeding a fluid of a first, lower, specific gravity from a fluid of a second, higher, specific gravity, in a fluid system, the bleed valve system comprising: a housing having a reservoir chamber end and a bleed chamber end, the housing defining a mounting axis extending therethrough in a direction of extension from the reservoir chamber end to the bleed chamber end; the housing including: a reservoir chamber at the reservoir chamber end, and a bleed chamber at the bleed chamber end; a fluid bleed conduit having an open end in direct communication with the bleed chamber; the open end not being in direct communication with the reservoir chamber; the open end of the fluid bleed conduit being located above a selected fluid detection level in the bleed chamber at all times during a 360° rotation of the housing around the mounting axis; and a fluid conduit arrangement communicating between the reservoir chamber and the bleed chamber; the fluid conduit arrangement being configured to transport a fluid from the reservoir chamber to the bleed chamber such that fluid can enter the bleed chamber at a location above a lower most portion of the open end of the fluid bleed conduit at all times during a 360° rotation of the housing around the mounting axis; and the fluid conduit arrangement also being configured such that fluid can also enter the bleed chamber at a location below the lower most portion of the open end of the fluid bleed conduit at all times during a 360° rotation of the housing around the mounting axis.

2. A bleed valve apparatus comprising: a conduit housing having a reservoir chamber and a bleed chamber, the conduit housing defining a mounting axis extending therethrough in a direction of extension from the reservoir chamber to the bleed chamber; a fluid bleed conduit having an fluid bleed entrance end in direct communication with the bleed chamber; the fluid bleed conduit extending along the mounting axis; a fluid conduit arrangement communicating between the reservoir chamber and the bleed chamber; the fluid conduit arrangement being configured to transport fluid from the reservoir chamber to the bleed chamber such that fluid can enter the bleed chamber at a location above, and also at a location below, a lowermost portion of the fluid bleed entrance end of the fluid bleed conduit at all times during a 360° rotation of the housing around the mounting axis; and a threaded mount fixed rotationally relative to the conduit housing such that the entire housing is configured to rotate when mounted.

3. A method of venting fluid from a pressurized fluid system comprising: providing fluid flow of a first, lower, specific gravity and fluid flow of a second, higher, specific gravity through a fluid conduit arrangement in an assembly housing, a fluid flow of a first, lower, specific gravity and a second, higher, specific gravity flowing from an entrance end of the assembly housing to a bleed chamber; and selectively venting fluid flow of a first, lower, specific gravity from the bleed chamber into a fluid bleed conduit, in a flow direction from the bleed chamber toward the entrance end of the housing.

4. A method of positioning an automatic bleed valve assembly on a fluid system for use; the method comprising: mounting an automatic bleed valve assembly with a threaded coupling by rotating the entire automatic bleed valve assembly around a mounting axis.

What is claimed is:

1. A bleed valve system for bleeding a fluid of a first, lower, specific gravity from a fluid of a second, higher, specific gravity in a fluid system, the bleed valve system comprising:
    a housing having a reservoir chamber end and a bleed chamber end, the housing defining a mounting axis extending therethrough in a direction of extension from the reservoir chamber end to the bleed chamber end; the housing including:
        a reservoir chamber at the reservoir chamber end, and
        a bleed chamber at the bleed chamber end;
    a fluid bleed conduit having an open end in direct communication with the bleed chamber; the open end not being in direct communication with the reservoir chamber, the open end of the fluid bleed conduit being located above a selected fluid detection level in the bleed chamber at all times during a 360° rotation of the housing around the mounting axis while the mounting axis is horizontally arranged; and
    a fluid conduit arrangement communicating between the reservoir chamber and the bleed chamber; the fluid conduit arrangement being configured to transport fluid from the reservoir chamber to the bleed chamber such that fluid can enter the bleed chamber at a location above a lower most portion of the open end of the fluid bleed conduit at all times during a 360° rotation of the housing around the mounting axis while the mounting axis is horizontally arranged; and
    the fluid conduit arrangement also being configured such that a fluid can enter the bleed chamber at a location below a lower most portion of the open end of the fluid bleed conduit at all times during a 360° rotation of the housing around the mounting axis while the mounting axis is horizontally arranged.

2. The bleed valve system of claim 1, wherein the fluid conduit arrangement is also configured so that fluid can enter the bleed chamber at a location below the selected fluid detection level at all times during a 360° rotation of the housing around the mounting axis.

3. The bleed valve system of claim 1, wherein the bleed valve system is configured to bleed air from a liquid system; and, the fluid bleed conduit is an air bleed conduit.

4. The bleed valve system of claim 1, wherein the fluid bleed conduit has a conical shaped sidewall.

5. The bleed valve system of claim 1, wherein the fluid bleed conduit has a sidewall of conical shape with an internal conical angle of at least 5°.

6. The bleed valve system of claim 5, wherein the internal conical angle is within a range of 10° to 20°.

7. The bleed valve system of claim 1, wherein the bleed chamber has a cross-dimension of at least 4.0 times a first cross-dimension of the fluid bleed conduit.

8. The bleed valve system of claim 1, wherein the fluid bleed conduit is adjacent to the bleed chamber and centrally aligned thereto.

9. The bleed valve system of claim 1, wherein the fluid bleed conduit is centered on the mounting axis.

10. The bleed valve system of claim 1, wherein the reservoir chamber and the bleed chamber are centered on the mounting axis.

11. The bleed valve system of claim 1, further comprising a fluid vent valve having a valve seat that is mounted in flow communication with the fluid bleed conduit, the fluid vent valve being configured to open in response to an activation signal to bleed excess fluid from the bleed chamber.

12. The bleed valve system of claim 11, wherein the fluid vent valve is a solenoid valve.

13. The bleed valve system of claim 1, further comprising a fluid level sensor mounted in the housing to measure a level of fluid within the housing, wherein the fluid level sensor is configured to generate a signal when the presence of a fluid of a first, lower specific gravity in the bleed chamber is sufficient to warrant bleeding.

14. The bleed valve system of claim 1, wherein the fluid conduit arrangement comprises a plurality of spaced ports extending from the reservoir chamber to the bleed chamber.

15. The bleed valve system of claim 14, wherein the plurality of spaced ports comprises at least 5 ports.

16. The bleed valve system of claim 14, wherein the plurality of spaced ports comprises no more than 9 ports.

17. The bleed valve system of claim 14, wherein each of the spaced ports of the fluid conduit arrangement each have a cross-dimension of at least 2.0 mm.

18. The bleed valve system of claim 1, further comprising a threaded mount for mounting to a pressurized fluid system.

19. The bleed valve system of claim 18, wherein the threaded mount is fixed rationally relative to the housing such that the housing rotates when mounted.

20. A bleed valve apparatus comprising:
    a conduit housing having a reservoir chamber and a bleed chamber, the conduit housing defining a mounting axis extending therethrough in a direction of extension from the reservoir chamber to the bleed chamber;
    a fluid bleed conduit having a fluid bleed entrance end in direct communication with the bleed chamber; the fluid bleed conduit extending along the mounting axis;
    a conduit arrangement communicating between the reservoir chamber and the bleed chamber; the conduit arrangement being configured to transport fluid from the reservoir chamber to the bleed chamber such that fluid can enter the bleed chamber at a location above, and also at a location below, a lower most portion of the fluid bleed entrance of the fluid bleed conduit at all times during a 360° rotation of the housing around the mounting axis while the mounting axis is horizontally arranged; and
    a threaded mount fixed rotationally relative to the conduit housing such that the entire housing when mounted is configured to rotate around the mounting axis while the mounting axis is horizontally arranged.

21. A method of venting fluid from a pressurized fluid system comprising:
    providing fluid flow of a first, lower, specific gravity and fluid flow of a second, higher, specific gravity through a fluid conduit arrangement in an assembly housing, a fluid flow of a first, lower, specific gravity and a second, higher, specific gravity flowing from an entrance end of the assembly housing to a bleed chamber;
    providing a fluid level sensor mounted in the assembly housing to measure a level of fluid within the assembly housing, wherein the fluid level sensor is configured to generate a signal when the presence of a fluid of the first, lower, specific gravity in the bleed chamber is sufficient to warrant bleeding; and selectively venting fluid flow of the first, lower, specific gravity from the bleed chamber into a fluid bleed conduit, in a flow direction from the bleed chamber toward the entrance end of the housing.

22. A bleed valve system for bleeding a fluid of a first, lower, specific gravity from a fluid of a second, higher, specific gravity in a fluid system, the bleed valve system comprising:
- a housing having a reservoir chamber end and a bleed chamber end, the housing defining a mounting axis extending therethrough in a direction of extension from the reservoir chamber end to the bleed chamber end; the housing including:
  - a reservoir chamber at the reservoir chamber end, and
  - a bleed chamber at the bleed chamber end;
- a fluid bleed conduit having an open end in direct communication with the bleed chamber, the open end not being in direct communication with the reservoir chamber, and the open end of the fluid bleed conduit being located above a selected fluid detection level in the bleed chamber at all times during a 360° rotation of the housing around the mounting axis;
- a fluid conduit arrangement communicating between the reservoir chamber and the bleed chamber, the fluid conduit arrangement being configured to transport fluid from the reservoir chamber to the bleed chamber such that fluid can enter the bleed chamber at a location above a lower most portion of the open end of the fluid bleed conduit at all times during a 360° rotation of the housing around the mounting axis, the fluid conduit arrangement also being configured such that a fluid can enter the bleed chamber at a location below a lower most portion of the open end of the fluid bleed conduit at all times during a 360° rotation of the housing around the mounting axis; and
- a fluid level sensor mounted in the housing to measure a level of fluid within the housing, wherein the fluid level sensor is configured to generate a signal when the presence of a fluid of a first, lower specific gravity in the bleed chamber is sufficient to warrant bleeding.

* * * * *